US011875535B2

United States Patent
Zou et al.

(10) Patent No.: US 11,875,535 B2
(45) Date of Patent: Jan. 16, 2024

(54) METHOD, APPARATUS, ELECTRONIC DEVICE AND COMPUTER READABLE MEDIUM FOR CALIBRATING EXTERNAL PARAMETER OF CAMERA

(71) Applicant: Beijing Baidu Netcom Science and Technology Co., Ltd., Beijing (CN)

(72) Inventors: Zhikang Zou, Beijing (CN); Xiaoqing Ye, Beijing (CN); Xiao Tan, Beijing (CN); Hao Sun, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 350 days.

(21) Appl. No.: 17/339,177

(22) Filed: Jun. 4, 2021

(65) Prior Publication Data

US 2021/0358169 A1 Nov. 18, 2021

(30) Foreign Application Priority Data

Nov. 30, 2020 (CN) .......................... 202011375196.4

(51) Int. Cl.
*G06T 7/80* (2017.01)
*G06T 7/73* (2017.01)

(52) U.S. Cl.
CPC ................. *G06T 7/80* (2017.01); *G06T 7/74* (2017.01); *G06T 2207/10028* (2013.01)

(58) Field of Classification Search
CPC ... G06T 7/80; G06T 7/74; G06T 2207/10028; G06T 2207/10004; G06T 2207/30204;
(Continued)

(56) References Cited

U.S. PATENT DOCUMENTS

| 2015/0310135 A1* | 10/2015 | Forsyth | ................ G06F 30/13 703/1 |
| 2021/0056713 A1* | 2/2021 | Rangesh | ................ G01S 17/66 |
| 2022/0270293 A1* | 8/2022 | Bao | ................ G06T 7/80 |

FOREIGN PATENT DOCUMENTS

| CN | 109978955 A | 7/2019 |
| CN | 111965624 A | 11/2020 |
| WO | 2018/103152 A1 | 6/2018 |

OTHER PUBLICATIONS

Liao, Qinghai et al., "Extrinsic Calibration of Lidar and Camera with Polygon", 2018 IEEE International Conference on Robotics and Biomimetics (ROBIO), IEEE, pp. 200-205, (Dec. 12, 2018).
(Continued)

*Primary Examiner* — Molly Wilburn
(74) *Attorney, Agent, or Firm* — Kilpatrick Townsend & Stockton LLP (57) ABSTRACT

A method and an apparatus for calibrating an external parameter of a camera are provided. The method may include: acquiring a time-synchronized data set of three-dimensional point clouds and two-dimensional image of a calibration reference object, the two-dimensional image being acquired by a camera with a to-be-calibrated external parameter; establishing a transformation relationship between a point cloud coordinate system and an image coordinate system, the transformation relationship including a transformation parameter; back-projecting the data set of the three-dimensional point clouds onto a plane where the two-dimensional image is located through the transformation relationship to obtain a set of projection points of the three-dimensional point clouds; adjusting the transformation parameter to map the set of the projection points onto the two-dimensional image; and obtaining an external parameter of the camera based on the adjusted transformation
(Continued)

US 11,875,535 B2

Page 2 parameter and the data set of the three-dimensional point clouds.

12 Claims, 3 Drawing Sheets

(58) Field of Classification Search
CPC ........... G06T 2207/30244; G06F 18/22; G06F 18/23213; G06F 18/24
See application file for complete search history.

(56) References Cited

OTHER PUBLICATIONS

Huang, Jiunn-Kai, et al., "Improvements to Target-Based 3D LiDAR to Camera Calibration", IEEE Access, IEEE, USA, vol. 8, pp. 134101-134110, (Jul. 21, 2020).
Mishra, Subodh, et al., "Extrinsic Calibration of a 3D-LIDAR and a Camera", 2020 IEEE Intelligent Vehicles Symposium (IV), IEEE, pp. 1765-1770, (Oct. 19, 2020).
Munoz-Banon Miguel Angel et al., "Targetless Camera-LiDAR Calibration in Unstructured Environments", IEEE Access, IEEE, USA, vol. 8, pp. 143692- 143705, (Aug. 3, 2020).
Jeong, Jinyong et al., "The Road is Enough! Extrinsic Calibration of Non-overlapping Stereo Camera and LiDAR using Road Information", IEEE Robotics and Automation Letters, IEEE, vol. 4, No. 3, pp. 2831-2838, (Jul. 1, 2019).
European Search Report dated Apr. 7, 2022 in related European Patent Application No. 21177324.7 (ten pages).

\* cited by examiner

METHOD, APPARATUS, ELECTRONIC DEVICE AND COMPUTER READABLE MEDIUM FOR CALIBRATING EXTERNAL PARAMETER OF CAMERA

CROSS-REFERENCE TO RELATED APPLICATIONS

This application claims the priority of Chinese Patent Application No. 202011375196.4, titled "METHOD, APPARATUS, ELECTRONIC DEVICE AND COMPUTER READABLE MEDIUM FOR CALIBRATING EXTERNAL PARAMETER OF CAMERA", filed on Nov. 30, 2020, the content of which is incorporated herein by reference in its entirety.

TECHNICAL FIELD

The present disclosure relates to the field of computer technology, in particular, to the technical field of artificial intelligence such as computer vision and image recognition, and more in particular, to a method, apparatus, electronic device and computer readable medium for calibrating an external parameter of a camera.

BACKGROUND

The camera external parameter calibration mainly uses the calibration technique to obtain the transformation relationships from the world coordinate system to the camera coordinate system. The transformation relationships can effectively determine position parameters and rotation parameters of the cameras in the word coordinate system, i.e., the external parameters of the cameras.

When calibrating the external parameters of the cameras in the conventional way, calibration reference objects with know sizes need to be used. By establishing the corresponding relationships between points with known coordinates on the calibration reference objects and image points of the cameras, the external parameters of the cameras are obtained through multiple calculations.

SUMMARY

Embodiments of the present disclosure provides a method, apparatus, electronic device and computer readable medium for calibrating an external parameter of a camera.

According to a first aspect, a method for calibrating an external parameter of a camera is provided, and the method includes: acquiring a data set of three-dimensional point clouds and two-dimensional image time-synchronized with the data set, of a calibration reference object, the two-dimensional image being acquired by a camera with a to-be-calibrated external parameter; establishing a transformation relationship between a point cloud coordinate system and an image coordinate system, the transformation relationship including a transformation parameter; back-projecting the data set of the three-dimensional point clouds onto a plane where the two-dimensional image is located through the transformation relationship to obtain a set of projection points of the three-dimensional point clouds; adjusting the transformation parameter to map the set of the projection points onto the two-dimensional image; and obtaining an external parameter of the camera based on the adjusted transformation parameter and the data set of the three-dimensional point clouds.

According to a second aspect, an apparatus for calibrating an external parameter of a camera is provided, and the apparatus includes: an acquisition unit configured to acquire a data set of three-dimensional point clouds and two-dimensional image time-synchronized with the data set, of a calibration reference object, the two-dimensional image being acquired by a camera with a to-be-calibrated external parameter; a modeling unit configured to establish a transformation relationship between a point cloud coordinate system and an image coordinate system, the transformation relationship including a transformation parameter; a projection unit configured to back-project the data set of the three-dimensional point clouds onto a plane where the two-dimensional image is located through the transformation relationship to obtain a set of projection points of the three-dimensional point clouds; an adjustment unit configured to adjust the transformation parameter to map the set of the projection points onto the two-dimensional image; and an obtaining unit configured to obtain an external parameter of the camera based on the adjusted transformation parameter and the data set of the three-dimensional point clouds.

According to a third aspect, an electronic device is provided, and the electronic device includes: at least one processor; and a memory in communication with the at least one processor, where the memory stores instructions executable by the at least one processor, and the instructions, when executed by the at least one processor, cause the at least one processor to perform the method as described in any one of the implementations of the first aspect.

According to a fourth aspect, a non-transitory computer readable storage medium storing computer instructions, where the computer instructions cause a computer to perform the method as described in any one of the implementations of the first aspect.

It should be appreciated that the content described in this section is not intended to identify the key or critical features of the embodiments of the present disclosure, nor is it intended to limit the scope of the present disclosure. The other features of the present disclosure will become easy to understand through the following description.

BRIEF DESCRIPTION OF THE DRAWINGS

The accompanying drawings are intended to provide a better understanding of the present disclosure and do not constitute a limitation to the present disclosure.

DETAILED DESCRIPTION OF EMBODIMENTS

Example embodiments of the present disclosure are described below in combination with the accompanying drawings, where various details of the embodiments of the present disclosure are included to facilitate understanding and should be considered as examples only. Therefore, those of ordinary skill in the art should realize that various changes and modifications may be made to the embodiments described herein without departing from the scope and spirit of the present disclosure. Similarly, for clarity and conciseness, descriptions of well-know functions and structures are omitted in the following description.

Figure 1:
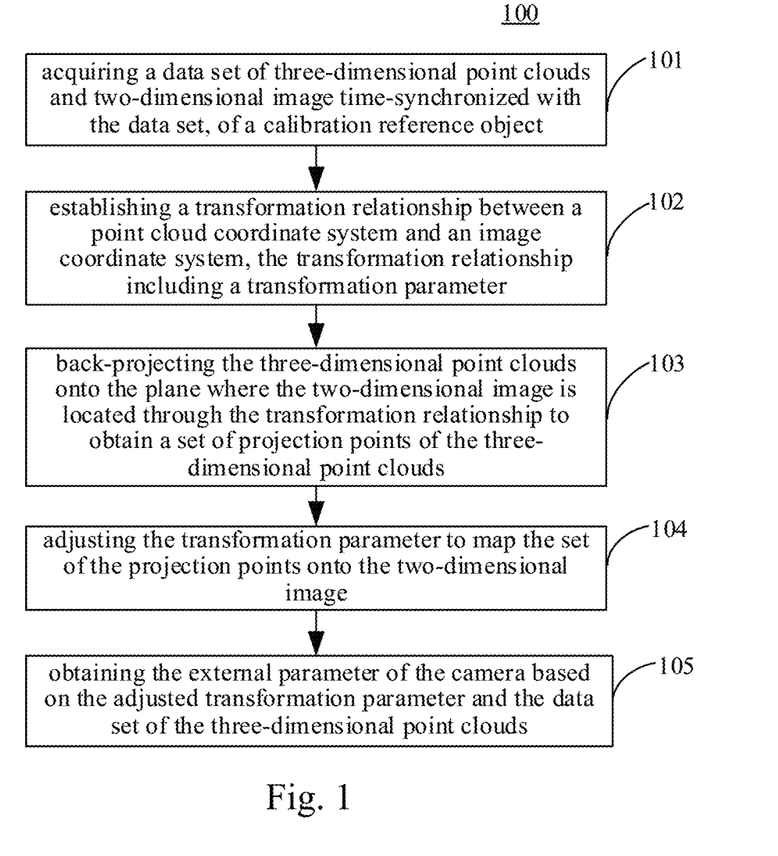
FIG. 1 is a flowchart of an embodiment of a method for calibrating an external parameter of a camera according to the present disclosure.

FIG. 1 illustrates a flow 100 of an embodiment of a method for calibrating an external parameter of a camera according to the present disclosure. The method for calibrating an external parameter of a camera includes steps 101 to 105.

Step 101 includes acquiring a data set of three-dimensional point clouds and two-dimensional image time-synchronized with the data set, of a calibration reference object, the two-dimensional image being acquired by a camera with a to-be-calibrated external parameter.

In this embodiment, the two-dimensional image of the calibration reference object is acquired by the camera with the to-be-calibrated external parameter. The camera mentioned in this embodiment is the camera with the to-be-calibrated external parameter. The data set of the three-dimensional point clouds of the calibration reference object may be acquired by a three-dimensional sensor, such as a radar or a three-dimensional scanner. The data set of the three-dimensional point clouds refers to a set of vectors in a three-dimensional coordinate system. The set is recorded in the form of points, and each point contains a three-dimensional coordinate, and some of the points may further contain color information or reflection intensity information.

In this embodiment, an execution body on which the method for calibrating an external parameter of a camera is performed may acquire the data set of three-dimensional point clouds and two-dimensional image time-synchronized with the data set by communicating with the camera and the three-dimensional sensor through a wired or wireless communication link.

Figure 2:
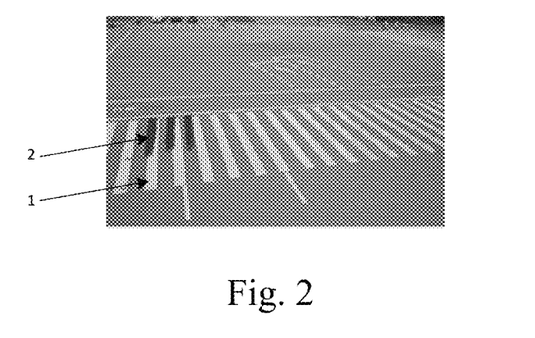
FIG. 2 is a flowchart of a method for mapping a set of projection points onto a two-dimensional image.

Further, the calibration reference object is generally located in the calibration scenario. As illustrated in FIG. 2, a calibration reference object used is a pedestrian line, and a calibration scenario where the pedestrian line is located includes a road surface, a lane line and the like. The calibration reference object obtained in the present disclosure may be a calibration reference object extracted from the calibration scenario.

In some alternative implementations of this embodiment, calibration reference objects include a pedestrian line, a lane line, a guardrail, a street light, a street sign, and other reference objects that are easy to be extracted from a surrounding scenario.

Parameters of a camera include a distortion parameter, an external parameter and an internal parameter. Generally, there are six external parameters: rotation parameters of three axes ($\omega$, $\delta$, $\theta$), 3*3 rotation matrices of axes being combined (that is, the matrices are multiplied first) to obtain R that collects the rotation information of the three axes, the size of R being still 3*3; and translation parameters ($T_x$, $T_y$, $T_z$) of the three axis of T that collects translation information. The 3*4 matrix formed by combining R and T is the key to the conversion to a calibration coordinate system. The main purpose of the method for calibrating an external parameter of a camera provided by this embodiment is to determine the specific values of R and T of the camera.

Step 102 includes establishing a transformation relationship between a point cloud coordinate system and an image coordinate system, the transformation relationship including a transformation parameter.

In this embodiment, the purpose of establishing the transformation relationship between the point cloud coordinate system and the image coordinate system is to facilitate projection of the data set of the three-dimensional point clouds onto a plane where the two-dimensional image is located. Specifically, equation (1) is used to express the transformation relationship between the point cloud coordinate system and the image coordinate system.

$$\frac{1}{Z_c}\begin{bmatrix} u \\ v \\ 1 \end{bmatrix} = K \begin{bmatrix} R & T \\ 0 & 1 \end{bmatrix} P_0 \qquad (1)$$

In equation (1), $P_0$ represents coordinates of the three-dimensional point clouds (obtained from the data set of the three-dimensional point clouds); R, T are unknown quantities; K is a known quantity (which may be determined by an internal parameter and a distortion parameter of the camera); $Z_c$ is a Z-axis coordinate of the data set of the three-dimensional point clouds in a camera coordinate system, and is a known quantity; and u and v are coordinates of the three-dimensional point clouds projected onto the plane where the two-dimensional image is located, and are measurable quantities.

In this embodiment, transformation parameters include R and T. Since K, $Z_c$ and $P_0$ are all known quantities in the transformation relationship, in this embodiment, by adjusting the values of R and T, a projection image, projected from the three-dimensional point clouds, in the plane where the two-dimensional image is located, may finally overlap the two-dimensional image.

Step 103 includes back-projecting the three-dimensional point clouds onto the plane where the two-dimensional image is located through the transformation relationship to obtain a set of projection points of the three-dimensional point clouds.

In this embodiment, the technology of back-projecting the three-dimensional point clouds onto the plane where the two-dimensional image is located is a mature technology in the art, and is thus not repeated herein.

Based on the principle of equation (1), the set of the projection points and the two-dimensional image may be simultaneously displayed on a same plane visually through some mature image processing tools.

Step 104 includes adjusting the transformation parameter to map the set of the projection points onto the two-dimensional image.

In this embodiment, on the basis of the above set of the visualized projection points and visualized two-dimensional image, the transformation parameter may be manually adjusted or automatically adjusted to finally map the set of the projection points onto the two-dimensional image. That is, the principle of this embodiment is that the three-dimensional point clouds may be projected onto the two-dimensional image through the transformation relationship expressed by equation (1) to obtain the set of the projection points; and adjusting the transformation parameters in the transformation relationship may make the set of the projection points match the two-dimensional image as much as possible, and the degree of overlap between a calibration reference object image 1 and the set 2 of the projection points illustrated in FIG. 2 represents the degree of matching. The higher the degree of overlap is, the better the degree of matching is, and the more accurate the obtained external reference of the camera is.

Step 105 includes obtaining the external parameter of the camera based on the adjusted transformation parameter and the data set of the three-dimensional point clouds.

In this embodiment, after the set of the projection points is mapped onto the two-dimensional image, the obtained adjusted transformation parameter may be used as the external parameter of the camera.

Since the camera has many external parameters, the high-precision matching between the set of the projection points and the two-dimensional image may not be realized only by adjusting the transformation parameter to map the set of the projection points onto the two-dimensional image, that is, the above obtained external parameter of the camera is a relatively rough external parameter.

Figure 3:
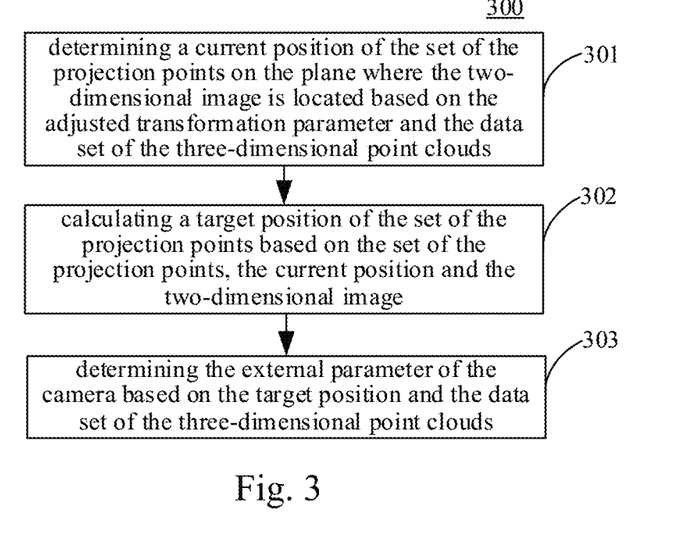
FIG. 3 is a flowchart of a method for obtaining an external parameter of a camera according to the present disclosure.

Alternatively, the high-precision matching between the set of the projection points and the two-dimensional image may be realized by an embodiment illustrated in FIG. 3, and finally the more accurate external parameter is obtained.

According to the method for calibrating an external parameter of a camera provided by the embodiment of the present disclosure, the data set of three-dimensional point clouds and two-dimensional image synchronized with the data set, of the calibration reference object is first acquired, the two-dimensional image being acquired by a camera with a to-be-calibrated external parameter; the transformation relationship between the point cloud coordinate system and the image coordinate system is established, the transformation relationship including the transformation parameter; the data set of the three-dimensional point clouds is back-projected onto the plane where the two-dimensional image is located through the transformation relationship to obtain the set of projection points of the three-dimensional point clouds; then, the transformation parameter is adjusted to map the set of the projection points onto the two-dimensional image; and finally, the external parameter of the camera is obtained based on the adjusted transformation parameter and the data set of the three-dimensional point clouds. The calibration process of the external parameter does not need to determine the size of the calibration reference object, and the calibration reference object can leave the calibration scenario after acquiring the data set of the three-dimensional point clouds and the two-dimensional image synchronized with the data set, of the calibration reference object, and the calibration process only needs to adjust the transformation parameter of the transformation relationship, and thus is sample and saves the calibration costs.

In the present embodiment, after the set of the projection points is mapped onto the two-dimensional image by adjusting the transformation parameter, the rough external parameter of the camera may be obtained. However, after the set of the projection points is mapped onto the two-dimensional image, a more accurate external parameter of the camera may be obtained by calculating a target position of the set of the projection points. In some alternative implementations of this embodiment, as illustrated in FIG. 3, a method for obtaining an external parameter of a camera includes steps 301 to 303.

Step 301 includes determining a current position of the set of the projection points on the plane where the two-dimensional image is located based on the adjusted transformation parameter and the data set of the three-dimensional point clouds.

In this embodiment, the coordinates of the three-dimensional point clouds may be obtained from the data set of the three-dimensional point clouds. According to equation (1), after the specific values of the transformation parameters R and T are determined, K is a known quantity. Therefore, u and v are correspondingly determined, and u and v are the current positions of the set of the projection points on the plane where the two-dimensional image is located.

Step 302 includes calculating a target position of the set of the projection points based on the set of the projection points, the current position and the two-dimensional image.

In this alternative implementation, since the degree of overlap between the set of projection points and the two-dimensional image represents the degree of matching. The higher the degree of overlap is, the better the degree of matching is, and the more accurate the obtained external parameter of the camera is. After determining the current position of the set of the projection points on the plane where the two-dimensional image is located, the position of the two-dimensional image may be determined based on the relative position between the set of the projection points and the two-dimensional image, and the position of the two-dimensional image is the target position of the set of the projection points.

In this alternative implementation, the two-dimensional image is a plane image, and the set of the projection points is also a plane image, and the relative position between the two-dimensional image and the set of the projection points may be determined through image processing technology.

In some alternative implementations of this embodiment, the calculating a target position of the set of the projection points based on the set of the projection points, the current position and the two-dimensional image includes: performing image processing on the two-dimensional image and the set of the projection points, respectively; calculating a position deviation value between the two-dimensional image and the set of the projection points based on an image processing result of the two-dimensional image and an image processing result of the set of the projection points; and calculating the target position of the set of the projection points based on the position deviation value and the current position.

In this alternative implementation, since the set of the projection points is the projection image of the data of the three-dimensional point clouds on the two-dimensional image, the image processing is performed on the two-dimensional image and the set of the projection points, the position deviation between the two-dimensional image and the set of the projection points is calculated based on the image processing results, and the target position of the set of the projection points is calculated based on the position deviation value and the current position. Therefore, the position difference between the two-dimensional image and the set of the projection points is determined through the image processing, which provides a reliable basis for obtaining an accurate target position of the set of the projection points, and further provides a basis for obtaining a more accurate external parameter of the camera.

Alternatively, there may be multiple ways to perform image processing on the two-dimensional image and the set of the projection points. For example, a first way is performing edge detection on the set of the projection points to obtain an outline image of the set of the projection points; and performing edge detection on the two-dimensional image to obtain an outline image of the two-dimensional image; and a second way is performing edge detection on the set of the projection points to obtain an outline image of the set of the projection points, and obtaining a position value of the outline center point of the set of the projection points through the outline image of the set of the projection points; and performing edge detection on the two-dimensional image to obtain an outline image of the two-dimensional image, and obtaining a position value of the outline center point of the two-dimensional image through the outline image of the two-dimensional image.

When calculating the position deviation value, for the first way, the outline image of the set of the projection points is moved toward the outline image of the two-dimensional image by an image tool. When the degree of overlap of the two images reaches a preset value (ratio of 90%), the moving displacement is the position deviation between the two-dimensional image and the set of the projection points. For the second way, the difference between the position value of the outline center point of the set of the projection points and the position value of the outline center point of the two-dimensional image is calculated to obtain the position deviation value between the two-dimensional image and the set of the projection points.

In some alternative implementations of this embodiment, the performing image processing on the two-dimensional image and the set of the projection points, respectively, includes: performing clustering processing on the set of the projection points to obtain a position value of a clustering center of the set of the projection points; and performing edge detection on the two-dimensional image, and calculating a position value of an image center of the two-dimensional image. In this alternative implementation, the calculating a position deviation value between the two-dimensional image and the set of the projection points based on an image processing result of the two-dimensional image and an image processing result of the set of the projection points includes: calculating difference between the position value of the clustering center and the position value of the image center to obtain the position deviation value between the two-dimensional image and the set of the projection points.

In this alternative implementation, the clustering processing refers to clustering and merging, using a morphological operator, points of similar classification areas in which the projection points are concentrated and close.

Alternatively, some common image detection and calibration tools may be used to calibrate the position value of the image center of the two-dimensional images. In addition to the edge detection and image detection calibration tools, the position value of the image center may be obtained in another way, which is not limited herein.

In this alternative implementation, the clustering processing is performed on the set of the projection points to obtain the position value of the clustering center, and the position deviation value between the two-dimensional image and the set of the projection points is determined according to the position value of the clustering center, so that the operation is easy and the implementation is simple, thereby providing a basis for obtaining the more accurate external parameter of the camera.

The process of obtaining the target position in an embodiment of the present application is described in detail with reference to FIG. 2. First, kmeans (an unsupervised clustering algorithm) clustering matching may be performed on three sets 2 of projection points to obtain three point classes {D1, D2, D3} of point clouds. Next, centers of the three point classes are determined, that is, clustering centers Cp1, Cp2, Cp3 of the three sets 2 of the projection points are determined.

The position of the corresponding calibration reference object image 1 is detected by a relatively mature pedestrian image detection method (such as the edge detection) to obtain three image centers Co1, Co2, and Co3 of the calibration reference object image 1.

The corresponding position deviation value is calculated and added to each point class. For example, D1'=D1+Co1−Cp1, that is, D1' is a target point class of the set 2 of the projection points. Based on the target point class and the current position of the set of the projection points, the correct target position of the projection points of the three-dimensional point clouds may be determined.

Step 303 includes determining the external parameter of the camera based on the target position and the data set of the three-dimensional point clouds.

In this alternative implementation, after obtaining the target position of the set of the projection points, the accurate external parameter of the camera may be calculated based on the matching relationship between the coordinates of the three-dimensional point clouds and the target position by using a PnP (perspective-n-point) algorithm.

The PnP algorithm is an algorithm for calculating an external parameter of a camera based on two-dimensional and three-dimensional corresponding point pairs, is a relatively mature algorithm, and is thus not repeated herein.

In this alternative implementation, the current position of the set of the projection points is first obtained based on the adjusted transformation parameter and the data set of the three-dimensional point clouds; then, the target position of the set of the projection points is calculated based on the set of the projection points, the current position of the set of projection points and the two-dimensional image; and finally, the external parameter of the camera is determined based on the target position and the data set of the three-dimensional point clouds. Therefore, this alternative implementation further calculates the target position of the set of the projection points corresponding to the accurate external parameter of the camera on the basis of the relatively rough external parameter of the camera, thereby improving the calibration accuracy of the external parameter of the camera.

Figure 4:
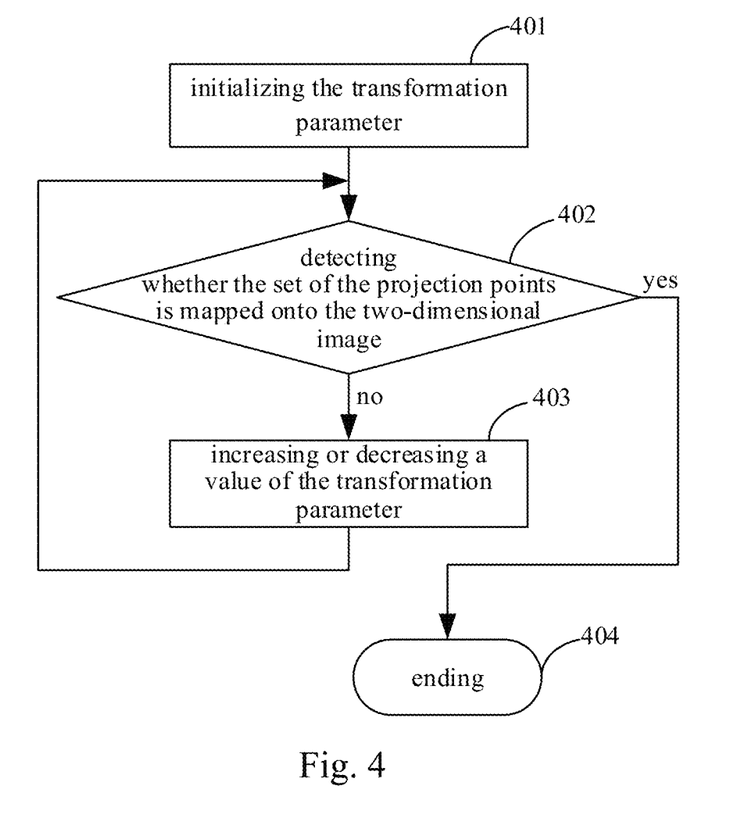
FIG. 4 is a flowchart of an embodiment of a method for adjusting a transformation parameter according to the present disclosure.

In order to improve the efficiency of adjusting the transformation parameter, the transformation parameter may be first initialized according to the transformation relationship equation, and when the set of the projection points is not mapped onto the two-dimensional image, the transformation parameter is adjusted so that the set of the projection points is finally mapped onto the two-dimensional image. Specifically, in some alternative implementations of this embodiment, a method for adjusting the transformation parameter as illustrated in FIG. 4 includes steps 401 to 404.

Step 401 includes initializing the transformation parameter and then performing step 402.

In this alternative implementation, with reference to equation (1), the transformation parameter may be initialized as an identity matrix as illustrated in (2).

$$\begin{bmatrix} R & T \\ 0 & 1 \end{bmatrix} = \begin{bmatrix} 1 & 0 & 0 & 0 \\ 0 & 1 & 0 & 0 \\ 0 & 0 & 1 & 0 \\ 0 & 0 & 0 & 0 \end{bmatrix} \quad (2)$$

In order to facilitate adjusting the transformation parameter, the transformation parameter may be initialized to another value, which is not limited herein.

Step 402 includes detecting whether the set of the projection points is mapped onto the two-dimensional image; and then performing step 403, in response to detecting that the set of the projection points is not mapped onto the two-dimensional image; or then performing step 404, in response to detecting that the set of the projection points is mapped onto the two-dimensional image.

In this embodiment, based on the principle of equation (1), the set of the projection points and the two-dimensional image may be simultaneously displayed on a same plane visually through some mature image processing tools. Further, manual observation may be used to determine whether the set of the projection points is mapped onto the two-dimensional image. Alternatively, some open source software (such as OpenCV) may determine the degree of overlap between the set of the projection points and the two-dimensional image to detect whether the set of the projection points is mapped onto the two-dimensional image.

Step 403 includes increasing or decreasing a value of the transformation parameter and returning to perform step 402.

In this alternative implementation, it can be seen from equation (1) that the transformation parameter is a matrix formed by combining R and T, and R and T are matrices formed by different parameters, respectively. Therefore, the increasing or decreasing transformation parameters includes: increasing one of the transformation parameters and decreasing another one of the transformation parameters; or increasing one of the transformation parameters; or decreasing one of the transformation parameters.

Step 404 includes ending.

According to the method for adjusting the transformation parameter provided by this embodiment, the transformation parameter is initialized, and on the basis of the initial value of the transformation parameter, the value of the adjustable external parameter is increased or decreased until the set of the projection points is mapped onto the two-dimensional image, so that the calculation amount of the adjustment process of the external parameter is reduced, and the universality of the adjustment of the external parameter is improved.

Figure 5:
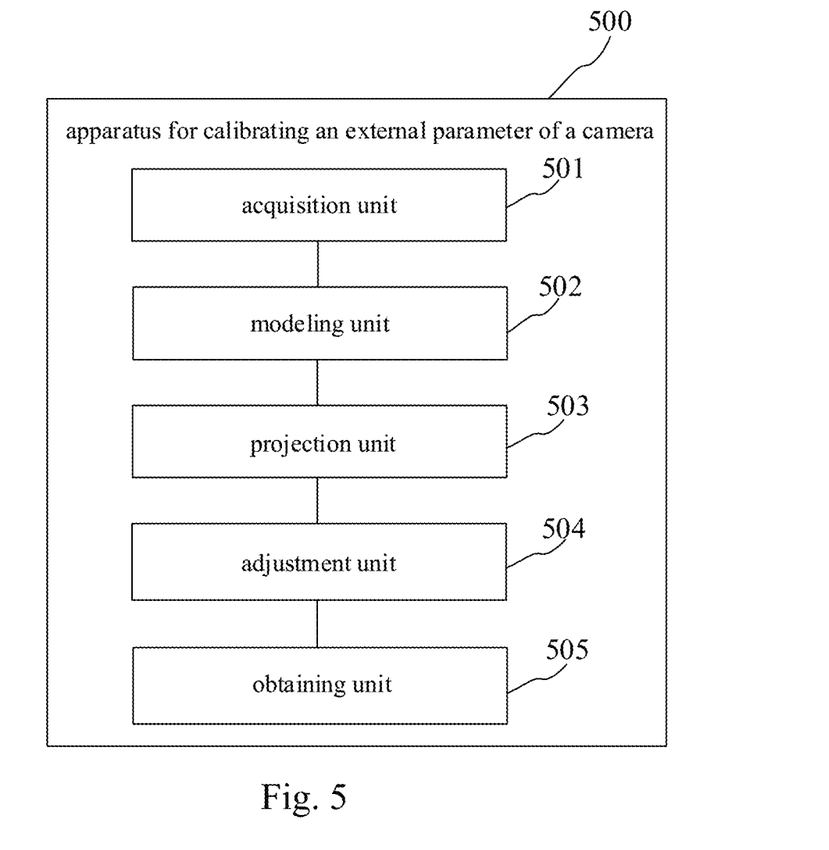
FIG. 5 is a schematic structural diagram of an embodiment of an apparatus for calibrating an external parameter of a camera according to the present disclosure.

Further referring to FIG. 5, as an implementation of the method shown in each of the above figures, the present disclosure provides an embodiment of an apparatus for calibrating an external parameter of a camera. The embodiment of the apparatus corresponds to the embodiment of the method illustrated in FIG. 1, and the apparatus is particularly applicable to various electronic devices.

As shown in FIG. 5, the apparatus 500 for calibrating an external parameter of a camera provided by this embodiment includes an acquisition unit 501, a modeling unit 502, a projection unit 503, an adjustment unit 504 and an obtaining unit 505. The acquisition unit 501 is configured to acquire a data set of three-dimensional point clouds and two-dimensional image time-synchronized with the data set, of a calibration reference object, the two-dimensional image being acquired by a camera with a to-be-calibrated external parameter; the modeling unit 502 is configured to establish a transformation relationship between a point cloud coordinate system and an image coordinate system, the transformation relationship including a transformation parameter; the projection unit 503 is configured to back-project the data set of the three-dimensional point clouds onto a plane where the two-dimensional image is located through the transformation relationship to obtain a set of projection points of the three-dimensional point clouds; the adjustment unit 504 is configured to adjust the transformation parameter to map the set of the projection points onto the two-dimensional image; and the obtaining unit 505 is configured to obtain an external parameter of the camera based on the adjusted transformation parameter and the data set of the three-dimensional point clouds.

In this embodiment, the specific processing of the acquisition unit 501, the modeling unit 502, the projection unit 503, the adjustment unit 504 and the obtaining unit 505 of the apparatus 500 for calibrating an external parameter of a camera and the technical effects thereof may be described with reference to the related description of steps 101 to 105 in the embodiment corresponding to FIG. 1, and are thus not repeated herein.

In some alternative implementations of this embodiment, the obtaining unit 505 includes: a positioning subunit (not shown), a calculation subunit (not shown) and a determining subunit (not shown). The positioning subunit is configured to determine a current position of the set of the projection points on the plane where the two-dimensional image is located based on the adjusted transformation parameter and the data set of the three-dimensional point clouds; the calculation subunit is configured to calculate a target position of the set of the projection points based on the set of the projection points, the current position and the two-dimensional image; and the determining subunit is configured to determine the external parameter of the camera based on the target position and the data set of the three-dimensional point clouds.

In some alternative implementations of this embodiment, the calculation subunit includes: an image processing module (not shown), a deviation calculation module (not shown) and a position calculation module (not shown). The image processing module is configured to perform image processing on the two-dimensional image and the set of the projection points, respectively; the deviation calculation module is configured to calculate a position deviation value between the two-dimensional image and the set of the projection points based on an image processing result of the two-dimensional image and an image processing result of the set of the projection points; and the position calculation module is configured to calculate the target position of the set of the projection points based on the position deviation value and the current position.

In some alternative implementations of this embodiment, the image processing module includes: a clustering submodule (not shown) and a detection submodule (not shown). The clustering submodule is configured to perform clustering processing on the set of the projection points to obtain a position value of the clustering center of the set of the projection points; and the detection submodule is configured to perform edge detection on the two-dimensional image, and calculate a position value of the image center of the two-dimensional image. The deviation calculation module is further configured to calculate difference between the position value of the clustering center and the position value of the image center to obtain the position deviation value between the two-dimensional image and the set of the projection points.

In some alternative implementations of this embodiment, the adjustment unit 504 includes: an initialization module (not shown) and an adjustment module (not shown). The initialization module is configured to initialize the transformation parameter; and the adjustment module is configured to increase or decrease a value of the transformation parameter until the set of the projection points is mapped onto the two-dimensional image, in response to detecting that the set of the projection points is not mapped onto the two-dimensional image.

According to the apparatus for calibrating an external parameter of a camera provided by the embodiment of the present disclosure, the acquisition unit 501 first acquires the data set of three-dimensional point clouds and two-dimensional image time-synchronized with the data set, of the calibration reference object, the two-dimensional image being acquired by the camera with the to-be-calibrated external parameter; the modeling unit 502 establishes the transformation relationship between the point cloud coordinate system and the image coordinate system, the transformation relationship including the transformation parameter; then the projection unit 503 back-projects the data set of the three-dimensional point clouds onto the plane where the two-dimensional image is located through the transformation relationship to obtain the set of projection points of the three-dimensional point clouds; the adjustment unit 504 adjusts the transformation parameter to map the set of the projection points onto the two-dimensional image; and finally the obtaining unit 505 obtains the external parameter of the camera based on the adjusted transformation parameter and the data set of the three-dimensional point clouds. The calibration process of the external parameter does not need to determine the size of the calibration reference object, and the calibration reference object can leave the calibration scenario after acquiring the data set of the three-dimensional point clouds and the two-dimensional image time-synchronized with the data set, of the calibration reference object, and the calibration process only needs to adjust the transformation parameter of the transformation relationship, and thus is sample and saves the calibration costs.

According to an embodiment of the present disclosure, the present disclosure further provides an electronic device and a readable storage medium.

Figure 6:
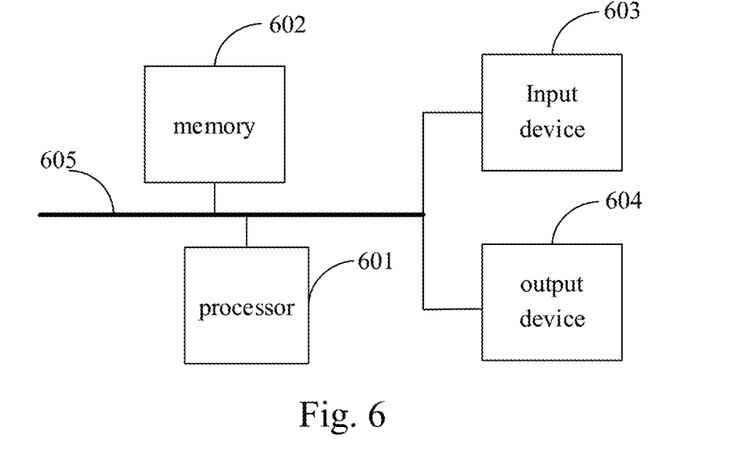
FIG. 6 is a block diagram of an electronic device for implementing the method for calibrating an external parameter of a camera according to an embodiment of the present disclosure.

FIG. 6 is a block diagram of an electronic device adapted to implement the method for calibrating an external parameter of a camera according to an embodiment of the present disclosure. The electronic device is intended to represent various forms of digital computers, such as laptops, desktops, worktables, personal digital assistants, servers, blade servers, mainframe computers and other suitable computers. The electronic device may also represent various forms of mobile devices, such as personal digital processing, cellular phones, smart phones, wearable devices and other similar computing devices. The parts, their connections and relationships, and their functions shown herein are examples only, and are not intended to limit the implementations of the present disclosure as described and/or claimed herein.

As shown in FIG. 6, the electronic device includes one or more processors 601, a memory 602 and interfaces for connecting components, including a high-speed interface and a low-speed interface. The components are interconnected by using different buses and may be mounted on a common motherboard or otherwise as required. The processor may process instructions executed within the electronic device, including instructions stored in memory or on memory to display graphical information of the GUI on an external input or output device (such as a display device coupled to an interface). In other embodiments, multiple processors and/or multiple buses and multiple memories may be used with multiple memories, if required. Similarly, multiple electronic devices may be connected (for example, used as a server array, a set of blade servers or a multiprocessor system), and the electronic device provides some of the necessary operations. An example of a processor 601 is shown in FIG. 6.

The memory 602 is a non-transitory computer readable storage medium according to the present disclosure. The memory stores instructions executable by at least one processor to cause the at least one processor to execute the method for calibrating an external parameter of a camera according to the present disclosure. The non-transitory computer readable storage medium of the present disclosure stores computer instructions for causing a computer to execute the method for calibrating an external parameter of a camera according to the present disclosure.

As a non-transitory computer readable storage medium, the memory 602 may be used to store non-transitory software programs, non-transitory computer executable programs and modules, such as the program instructions or modules corresponding to the method for calibrating an external parameter of a camera in the embodiment of the present disclosure (for example, the acquisition unit 501, the modeling unit 502, the projection unit 503, the adjustment unit 504 and the obtaining unit 505 illustrated in FIG. 5). The processor 601 runs the non-transitory software programs, instructions and modules stored in the memory 602 to execute various functional applications and data processing of the server, thereby implementing the method for calibrating an external parameter of a camera in the embodiment of the method.

The memory 602 may include a storage program area and a storage data area, where the storage program area may store an operating system and an application program required by at least one function; and the storage data area may store data created by the electronic device when executing the method for calibrating an external parameter of a camera. In addition, the memory 602 may include a high-speed random access memory, and may further include a non-transitory memory, such as at least one magnetic disk storage device, a flash memory or other non-transitory solid state storage devices. In some embodiments, the memory 602 may alternatively include a memory disposed remotely relative to the processor 601, which may be connected through a network to the electronic device adapted to execute the method for calibrating an external parameter of a camera. Examples of such networks include, but are not limited to, the Internet, enterprise intranets, local area networks, mobile communication networks and combinations thereof.

The electronic device adapted to execute the method for calibrating an external parameter of a camera may further include an input device 603 and an output device 604. The processor 601, the memory 602, the input device 603 and the output device 604 may be interconnected through a bus 605 or other means, and an example of a connection through the bus 605 is shown in FIG. 6.

The input device 603 may receive input digit or character information, and generate key signal input related to user settings and functional control of the electronic device adapted to execute the method for calibrating an external parameter of a camera, such as a touch screen, a keypad, a mouse, a track pad, a touch pad, a pointer bar, one or more mouse buttons, a trackball or a joystick. The output device 604 may include a display device, an auxiliary lighting device (such as an LED) and a tactile feedback device (such as a vibration motor). The display device may include, but is not limited to, a liquid crystal display (LCD), a light emitting diode (LED) display and a plasma display. In some embodiments, the display device may be a touch screen.

The various embodiments of the systems and technologies described herein may be implemented in digital electronic circuit systems, integrated circuit systems, ASICs (application specific integrated circuits), computer hardware, firmware, software and/or combinations thereof. The various embodiments may include: being implemented in one or more computer programs, where the one or more computer programs may be executed and/or interpreted on a programmable system including at least one programmable processor, and the programmable processor may be a dedicated or general-purpose programmable processor, which may receive data and instructions from a memory system, at least one input device and at least one output device, and send the data and instructions to the memory system, the at least one input device and the at least one output device.

These computing programs (also known as programs, software, software applications or code) include machine instructions of a programmable processor and may be implemented in high-level procedures and/or object-oriented programming languages, and/or assembly or machine languages. As used herein, the terms "machine readable medium" and "computer readable medium" refer to any computer program product, device and/or apparatus (such as magnetic disk, optical disk, memory and programmable logic device (PLD)) for providing machine instructions and/or data to a programmable processor, including a machine readable medium that receives machine instructions as machine readable signals. The term "machine readable signal" refers to any signal used to provide machine instructions and/or data to a programmable processor.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementation of the systems and technologies described herein), or a computing system including any combination of such background component, middleware component or front-end component. The components of the system may be interconnected by any form or medium of digital data communication (such as a communication network). Examples of communication networks include a local area network (LAN), a wide area network (WAN), and the Internet.

The computer system may include a client and a server. The client and the server are typically remote from each other and typically interact through a communication network. The relationship between the client and the server is generated by a computer program running on the corresponding computer and having a client-server relationship with each other. The server may be a cloud server, also known as a cloud computing server or a cloud host, which is a host product in the cloud computing service system and may solve the defects of difficult management and weak service scalability existing in a conventional physical host and a VPS (Virtual Private Server) service.

It should be appreciated that the steps of reordering, adding or deleting may be executed using the various forms shown above. For example, the steps described in the present disclosure may be executed in parallel or sequentially or in a different order, so long as the expected results of the technical solutions provided in the present disclosure may be realized, and no limitation is imposed herein.

The above specific implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for calibrating an external parameter of a camera, the method comprising:
    acquiring a data set of three-dimensional point clouds and a two-dimensional image time-synchronized with the data set, of a calibration reference object, the two-dimensional image being acquired by the camera with a to-be-calibrated external parameter;
    establishing a transformation relationship between a point cloud coordinate system and an image coordinate system, the transformation relationship comprising a transformation parameter;
    back-projecting the data set of the three-dimensional point clouds onto a plane where the two-dimensional image is located through the transformation relationship to obtain a set of projection points of the three-dimensional point clouds;
    adjusting the transformation parameter to map the set of projection points onto the two-dimensional image to obtain an adjusted transformation parameter; and
    obtaining the to-be-calibrated external parameter of the camera based on the adjusted transformation parameter and the data set of the three-dimensional point clouds,
    wherein the adjusting the transformation parameter to map the set of projection points onto the two-dimensional image, comprises:
        initializing the transformation parameter; and
        increasing or decreasing a value of the transformation parameter until the set of projection points is mapped onto the two-dimensional image, in response to detecting that the set of projection points is not mapped onto the two-dimensional image.

2. The method according to claim 1, wherein the obtaining the external parameter of the camera based on the adjusted transformation parameter and the data set of the three-dimensional point clouds, comprises:
    determining a current position of the set of projection points on the plane where the two-dimensional image is located based on the adjusted transformation parameter and the data set of the three-dimensional point clouds;
    calculating a target position of the set of projection points based on the set of projection points, the current position and the two-dimensional image; and
    determining the external parameter of the camera based on the target position and the data set of the three-dimensional point clouds.

3. The method according to claim 2, wherein the calculating the target position of the set of projection points based on the set of projection points, the current position and the two-dimensional image, comprises:
performing image processing on the two-dimensional image and the set of projection points, respectively;
calculating a position deviation value between the two-dimensional image and the set of projection points based on a first image processing result of the two-dimensional image and a second image processing result of the set of projection points; and
calculating the target position of the set of projection points based on the position deviation value and the current position.

4. The method according to claim 3, wherein performing the image processing on the two-dimensional image and the set of projection points, respectively, comprises:
performing clustering processing on the set of projection points to obtain a first position value of a clustering center of the set of projection points; and
performing an edge detection on the two-dimensional image, and calculating a second position value of an image center of the two-dimensional image, and
wherein the calculating of the position deviation value between the two-dimensional image and the set of projection points based on the first image processing result of the two-dimensional image and the second image processing result of the set of projection points, comprises:
calculating a difference between the first position value of the clustering center and the second position value of the image center to obtain the position deviation value between the two-dimensional image and the set of projection points.

5. An electronic device, comprising:
at least one processor; and
a memory in communication with the at least one processor, wherein the memory stores instructions executable by the at least one processor, and the instructions, when executed by the at least one processor, cause the at least one processor to perform operations comprising:
acquiring a data set of three-dimensional point clouds and a two-dimensional image time-synchronized with the data set, of a calibration reference object, the two-dimensional image being acquired by a camera with a to-be-calibrated external parameter;
establishing a transformation relationship between a point cloud coordinate system and an image coordinate system, the transformation relationship comprising a transformation parameter;
back-projecting the data set of the three-dimensional point clouds onto a plane where the two-dimensional image is located through the transformation relationship to obtain a set of projection points of the three-dimensional point clouds;
adjusting the transformation parameter to map the set of projection points onto the two-dimensional image to obtain an adjusted transformation parameter; and
obtaining the to-be-calibrated external parameter of the camera based on the adjusted transformation parameter and the data set of the three-dimensional point clouds
wherein the adjusting the transformation parameter to map the set of projection points onto the two-dimensional image, comprises:
initializing the transformation parameter; and
increasing or decreasing a value of the transformation parameter until the set of projection points is mapped onto the two-dimensional image, in response to detecting that the set of projection points is not mapped onto the two-dimensional image.

6. The electronic device according to claim 5, wherein the obtaining the to-be-calibrated external parameter of the camera based on the adjusted transformation parameter and the data set of the three-dimensional point clouds, comprises:
determining a current position of the set of projection points on the plane where the two-dimensional image is located based on the adjusted transformation parameter and the data set of the three-dimensional point clouds;
calculating a target position of the set of projection points based on the set of projection points, the current position and the two-dimensional image; and
determining the to-be-calibrated external parameter of the camera based on the target position and the data set of the three-dimensional point clouds.

7. The electronic device according to claim 6, wherein the calculating the target position of the set of projection points based on the set of projection points, the current position and the two-dimensional image, comprises:
performing image processing on the two-dimensional image and the set of projection points, respectively;
calculating a position deviation value between the two-dimensional image and the set of projection points based on a first image processing result of the two-dimensional image and a second image processing result of the set of projection points; and
calculating the target position of the set of projection points based on the position deviation value and the current position.

8. The electronic device according to claim 7, wherein performing the image processing on the two-dimensional image and the set of projection points, respectively, comprises:
performing clustering processing on the set of projection points to obtain a first position value of a clustering center of the set of projection points; and
performing an edge detection on the two-dimensional image, and calculating a second position value of an image center of the two-dimensional image, and
wherein the calculating of the position deviation value between the two-dimensional image and the set of projection points based on the first image processing result of the two-dimensional image and the second image processing result of the set of projection points, comprises:
calculating a difference between the first position value of the clustering center and the second position value of the image center to obtain the position deviation value between the two-dimensional image and the set of projection points.

9. A non-transitory computer readable storage medium storing computer instructions, wherein the computer instructions cause a computer to perform operations comprising:
acquiring a data set of three-dimensional point clouds and a two-dimensional image time-synchronized with the data set, of a calibration reference object, the two-dimensional image being acquired by a camera with a to-be-calibrated external parameter;
establishing a transformation relationship between a point cloud coordinate system and an image coordinate system, the transformation relationship comprising a transformation parameter;

back-projecting the data set of the three-dimensional point clouds onto a plane where the two-dimensional image is located through the transformation relationship to obtain a set of projection points of the three-dimensional point clouds;

adjusting the transformation parameter to map the set of projection points onto the two-dimensional image to obtain an adjusted transformation parameter; and obtaining the to-be-calibrated external parameter of the camera based on the adjusted transformation parameter and the data set of the three-dimensional point clouds, wherein the adjusting the transformation parameter to map the set of projection points onto the two-dimensional image, comprises:

initializing the transformation parameter; and increasing or decreasing a value of the transformation parameter until the set of projection points is mapped onto the two-dimensional image, in response to detecting that the set of projection points is not mapped onto the two-dimensional image.

10. The non-transitory computer readable storage medium according to claim 9, wherein the obtaining the to-be-calibrated external parameter of the camera based on the adjusted transformation parameter and the data set of the three-dimensional point clouds, comprises:

determining a current position of the set of projection points on the plane where the two-dimensional image is located based on the adjusted transformation parameter and the data set of the three-dimensional point clouds;

calculating a target position of the set of projection points based on the set of projection points, the current position and the two-dimensional image; and determining the to-be-calibrated external parameter of the camera based on the target position and the data set of the three-dimensional point clouds.

11. The non-transitory computer readable storage medium according to claim 10, wherein the calculating the target position of the set of projection points based on the set of projection points, the current position and the two-dimensional image, comprises:

performing image processing on the two-dimensional image and the set of projection points, respectively;

calculating a position deviation value between the two-dimensional image and the set of projection points based on a first image processing result of the two-dimensional image and a second image processing result of the set of projection points; and calculating the target position of the set of projection points based on the position deviation value and the current position.

12. The non-transitory computer readable storage medium according to claim 11, wherein performing the image processing on the two-dimensional image and the set of projection points, respectively, comprises:

performing clustering processing on the set of projection points to obtain a first position value of a clustering center of the set of projection points; and performing an edge detection on two-dimensional image, and calculating a second position value of an image center of the two-dimensional image, and wherein the calculating of the position deviation value between the two-dimensional image and the set of projection points based on the first image processing result of the two-dimensional image and the second image processing result of the set of projection points, comprises:

calculating a difference between the first position value of the clustering center and the second position value of the image center to obtain the position deviation value between the two-dimensional image and the set of projection points.

\* \* \* \* \*

UNITED STATES PATENT AND TRADEMARK OFFICE
CERTIFICATE OF CORRECTION

PATENT NO. : 11,875,535 B2
APPLICATION NO. : 17/339177
DATED : January 16, 2024
INVENTOR(S) : Zhikang Zou et al.

It is certified that error appears in the above-identified patent and that said Letters Patent is hereby corrected as shown below:

In the Claims

Claim 5, in Column 15, Line (64), delete "clouds" and insert -- clouds, --.

Signed and Sealed this
Twenty-seventh Day of February, 2024

Katherine Kelly Vidal
*Director of the United States Patent and Trademark Office*